(No Model.)
A. H. & T. A. SCHLUETER.
LIQUID CONTAINING AND DISCHARGING DEVICE.
No. 519,478. Patented May 8, 1894.
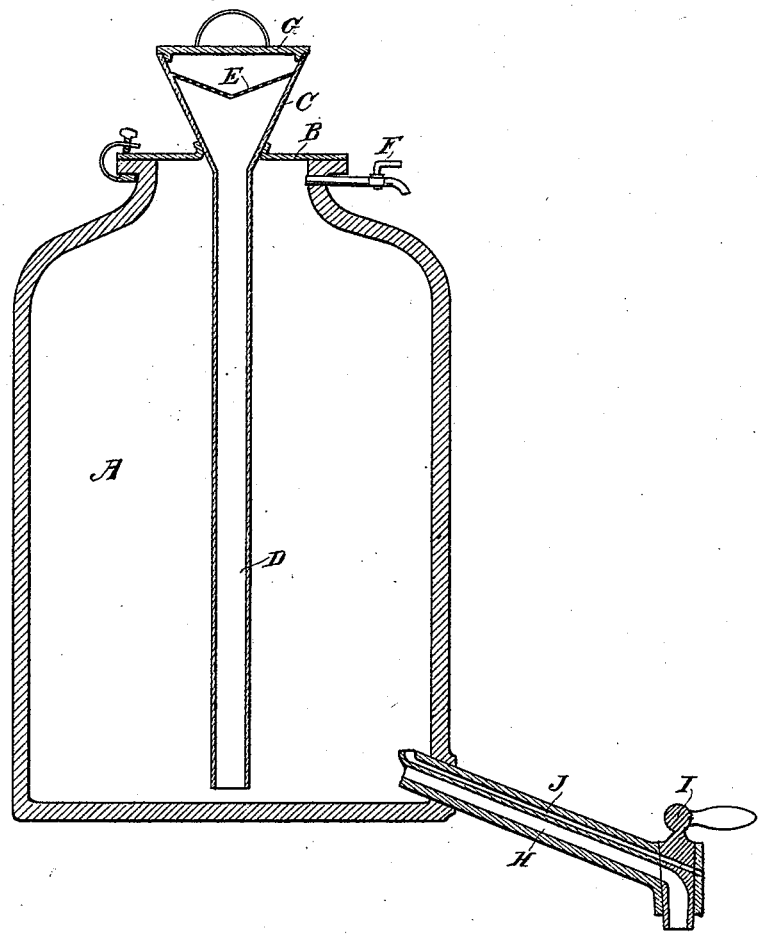
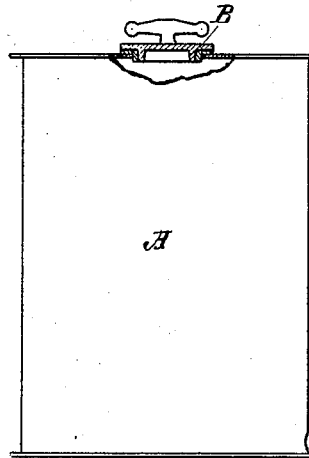

UNITED STATES PATENT OFFICE.

ADOLPH H. SCHLUETER AND THEODORE A. SCHLUETER, OF OAKLAND, CALIFORNIA.

LIQUID CONTAINING AND DISCHARGING DEVICE.

SPECIFICATION forming part of Letters Patent No. 519,478, dated May 8, 1894.

Application filed August 17, 1893. Serial No. 483,382. (No model.)

*To all whom it may concern:*

Be it known that we, ADOLPH H. SCHLUETER and THEODORE A. SCHLUETER, citizens of the United States, residing in Oakland, Alameda county, State of California, have invented an Improvement in Liquid Containing and Discharge Devices; and we hereby declare the following to be a full, clear, and exact description of same.

Our invention relates to a containing chamber for liquids.

It consists of a means for aerating and agitating the contents, and providing an even discharge therefrom, and means for replenishing the same when emptied, and in certain details of construction.

Referring to the accompanying drawings for a more complete explanation of our invention,—Figure 1 is a sectional elevation of our apparatus. Fig. 2 is a modification of the chamber.

The object of our invention is to provide a device which is especially designed for containing milk and other liquids, the constituents of which are inclined to separate from each other when the liquid remains for a considerable time in a quiescent state, and to keep the liquid agitated so as to prevent such separation and protect the surface from dust or from atmospheric effects, and to provide a convenient means for drawing off the liquid from time to time and simultaneously agitating it; and also a means for conveniently filling the receptacle, or for cleansing the same when necessary.

A is a chamber or vessel which is made of any suitable form or size. In the present case we have shown it preferably of earthenware in the form of a vase having the largest diameter at the bottom and decreasing toward the top.

B is a covering which is adapted to fit closely over the mouth of this vessel and hermetically seal it, the mouth being made of sufficient size so that when the cover is removed the interior can be reached for the purpose of cleansing, as it is necessary to frequently do this when the vessel is used for containing milk. In the cap or cover B is fitted a funnel C, from the bottom of which a tube D extends downwardly to very near the bottom of the chamber A. In the funnel C is fitted a concave screen E which serves to strain the milk and prevent any foreign substance from passing into the chamber with it.

F is a tube with a cock which is opened when the vessel is to be filled so as to allow the air to escape, the cover B being hermetically closed upon the top of the vessel so that no air can escape or enter around it. The cock F being opened, milk or other liquid poured into the funnel C, passes through the strainer E, and down through the pipe D rising within the chamber around the pipe until the chamber is filled, after which the cock at F is closed, and no air can enter around the top of the chamber.

G is a cover which may be placed over the top of the funnel C to prevent dust or dirt from entering.

H is the barrel of the discharge faucet which is fitted into the side of the chamber close to the bottom, and extends downwardly and outwardly at an angle to a considerable length and is closed by a cock I which fits into its outer end at a point considerably below the level of the bottom of the chamber A. A small passage J extends along the barrel of the faucet the inner end opening into the interior of the chamber, and the outer end communicating with a corresponding passage made through the cock, so that the two will be opened and closed simultaneously. The object of this inclination of the barrel is to have the faucet body H full of liquid to a point considerably below the bottom of the chamber A, so that when the cock is opened, the weight of this liquid will be sufficient to cause the contents of the vessel A to descend and flow out the faucet. This action produces a certain amount of vacuum in the upper part of the chamber A exterior to the tube D, and when this vacuum becomes sufficiently strong, the air from the outside will force its way in through the passage J, when the air will commence to rise in bubbles through the liquid within the vessel A. As the air thus rises, it continually agitates the liquid and prevents the separation, thus keeping the cream of the milk constantly and evenly mixed throughout the contents of the vessel until the latter is emptied, so that when milk is being sold in small quantities from the large receptacle, the whole body of the milk will be kept of a uniform quality. The air which is admitted through the passage J, serves to take the place of the liquid which is being drawn out.

By making the faucet body H of considerable length from the body of the vessel A to the cock I, this faucet body will always be filled with the liquid and in readiness to act by gravitation as soon as the cock is opened, and cause the liquid to flow and the air to enter as above described.

The faucet passages being made in a straight line, as shown, are easily cleaned when open, which is an important consideration where milk is to be handled.

Having thus described our invention, what we claim as new, and desire to secure by Letters Patent, is—

1. A vessel for containing liquids having the open top, the removable cap by which it is hermetically closed, a funnel and pipe passing through said cap extending to a point near the bottom of the vessel said vessel having an air escape cock to be opened when the vessel is being filled, and closed after it is full, a discharge cock leading from the lower part of the vessel and having the outer end of the faucet barrel thereof below the level of the bottom of the vessel, and having an air passage whereby the liquid will be compelled to flow and the air to pass in to take the place of the discharge liquid, substantially as herein described.

2. A containing vessel for milk having the open top fitted thereto by which the top is hermetically closed, a funnel fitting into said cap and a pipe forming a continuation of the funnel and extending to a point near the bottom of the containing vessel, a strainer fitting the funnel, an air cock fixed in the upper part of the containing vessel, through which air is allowed to escape when the vessel is to be filled through the funnel and pipe, said cock being closed while the liquid is being drawn from the vessel, a cock projecting from the lower part of the vessel and inclining downwardly so that the faucet barrel inside of the plug of the cock is below the level of the bottom of the vessel, said faucet barrel having an air passage whereby the liquid is caused to flow and a vacuum produced into which the air passes, substantially as herein described.

3. A vessel hermetically closed and provided with means for filling it and an air escape cock, a faucet having an inclined barrel with independent passages for the escape of the liquid and the ingress of air into the body of liquid within the vessel, and a plug with ports corresponding with the passages.

In witness whereof we have hereunto set our hands.

ADOLPH H. SCHLUETER.
THEODORE A. SCHLUETER.

Witnesses:
S. H. NOURSE,
J. A. BAYLESS.